D. Mendenhall.
Harvester-Rake.

N° 76339

Patented Apr. 7, 1868

Witnesses.
W.S. Campbell
Edw Schafer

Inventor
D. Mendenhall
by
Mason, Fenwick & Lawrence

United States Patent Office.

D. MENDENHALL, OF FAIRFIELD, IOWA.

Letters Patent No. 76,339, dated April 7, 1868.

---

IMPROVEMENT IN HARVESTER-RAKES.

---

The Schedule referred to in these Letters Patent and making part of the same.

---

TO ALL WHOM IT MAY CONCERN:

Be it known that I, D. MENDENHALL, of Fairfield, in the county of Jefferson, and State of Iowa, have invented a new and improved Raking-Attachment for Reaping-Machines; and I do hereby declare that the following is a full, clear, and exact description thereof, reference being had to the accompanying drawings, making part of this specification, in which—

Similar letters of reference indicate corresponding parts in the three figures.

The object of this invention is to clear the platform of a reaping-machine of cut grain, and deliver the grain upon the ground in gavels or bundles from or at the inner end of the platform, by means of a reciprocating rake or clearer, operating in conjunction with a hinged section of said platform, in such manner that this hinged section can be made to serve as a fender or guard, for preventing the grain from falling upon or becoming entangled with the rake or clearer in the return-stroke of the latter, as will be hereinafter described.

To enable others skilled in the art to understand my invention, I will describe its construction and operation.

In the accompanying drawings, A represents the main draught-frame of a reaping-machine, which frame is mounted upon two wheels, B B, either one or both of which may be drivers, and so applied on their axle C as to turn freely around it when the machine is backed.

Figure 1:
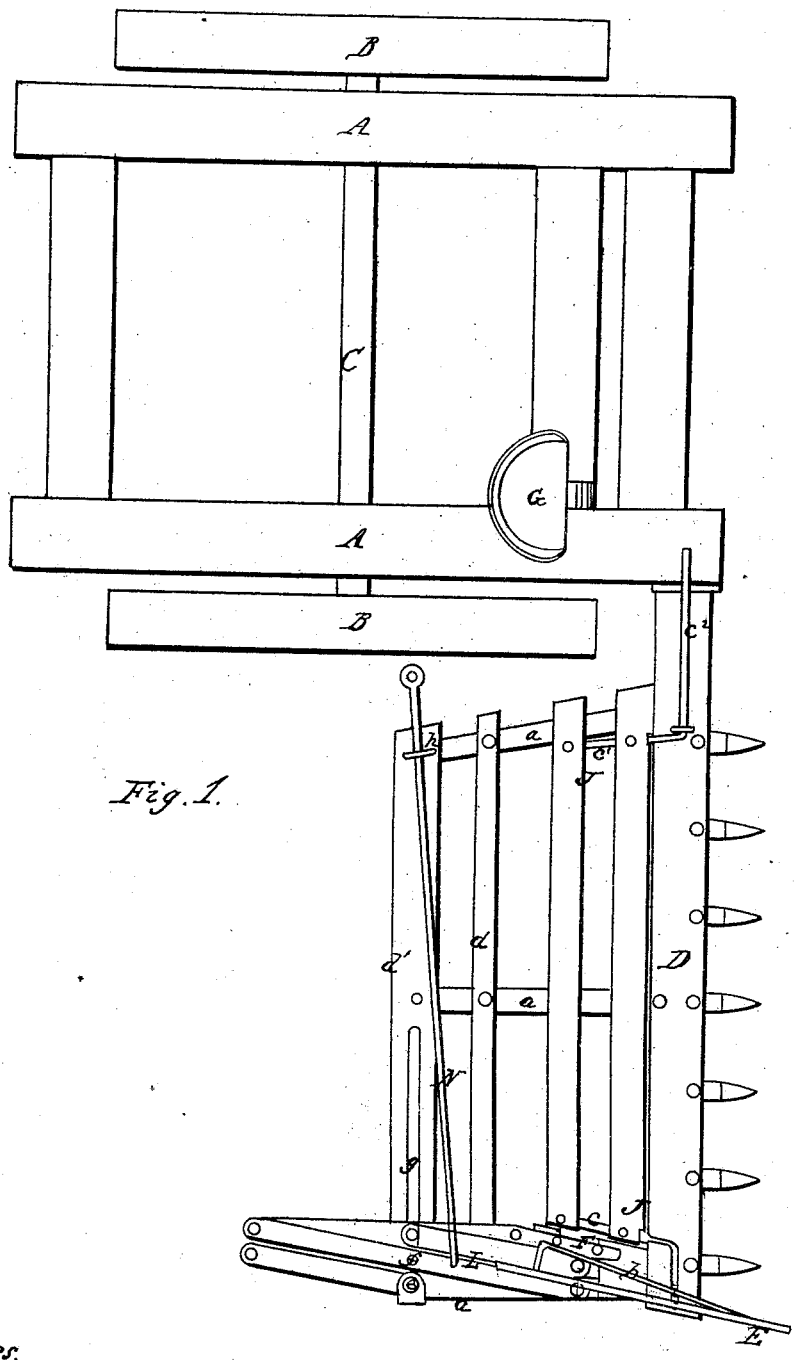
Figure 1 is a top view, showing my improved raking-device attached to a draught-frame, with the rake or clearer in position for commencing a raking-stroke across the platform.
Figure 2:
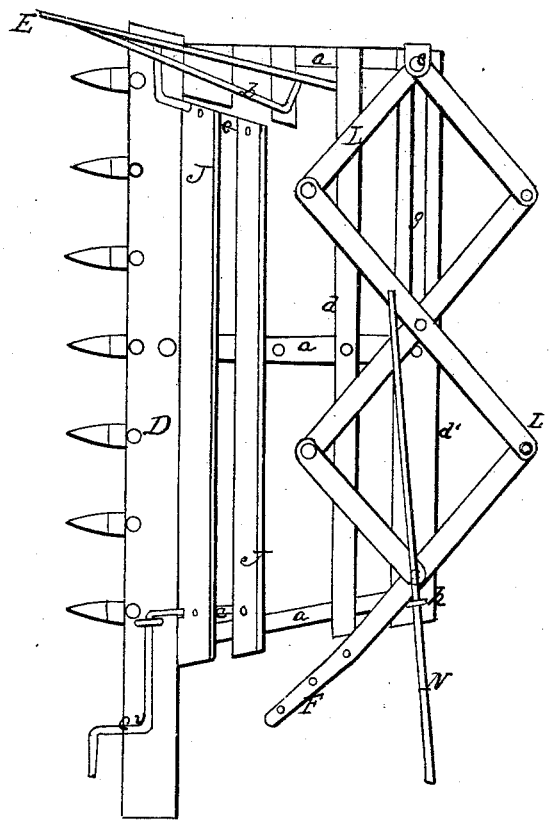
Figure 2 is a top view of the raking-device, showing the rake in a position for discharging a gavel from the inner end of the platform.

To one side of the draught-frame A, either in front or in rear of the transporting-wheel, I attach the finger-beam D, by means of a hinge, loose-joint or otherwise, so that this beam may accommodate itself to the surface of the ground passed over, and to this beam I secure longitudinal bars $a\ a\ a$, so as to extend back, and form supports for slats which compose the platform or grain-receiver, as shown in the drawings. At the outer end of this platform is the divider E, having a guard-rail, $b$, applied on its inner side, which is designed to prevent the cut grain from falling upon and becoming entangled with the teeth of the rake or clearer F, when the latter is in the position shown in fig. 1. The guard-rail $b$ also prevents the grain from falling outside of the rake.

Figure 3:
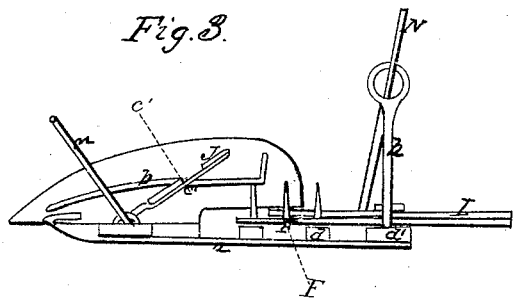
Figure 3 is an elevation of the platform and raking-device.

The front part of the platform is composed of two slats, arranged parallel to the finger-beam D, at a suitable distance apart, and secured to short arms $c\ c'$. These arms are suitably hinged to the finger-beam, and the inner arm $c'$, or that nearest the main frame A, is bent upward and inward, so as to form a handle or treadle, $c^2$, by which the attendant, whilst sitting upon the seat G on frame A, can vibrate the front part of the platform, which I shall letter J, and bring it to the position shown in fig. 3, to allow the rake to return to the outer end of the platform unobstructed by falling grain. In rear of the hinged section J, two or more slats, $d\ d'$, are secured permanently to the longitudinal bars $a\ a\ a$, which complete the platform or grain-receiver.

The rake or clearer F is one of several rods which are pivoted together in such manner as to form what are known as extension-joints, the two outermost rods or arms of which are pivoted, by a vertical pin, $e$, to the outer end of the rear slat $d'$ of the platform, and on top thereof. The two intermediate rods or arms of the extension-joints L are pivoted together by a pin, $f$, which passes down through a long slot, $g$, through the slat $d'$, and which serves to guide the joints, and to keep the rake F in proper position in its passage back and forth from one end to the other of the platform. The rake-teeth project perpendicularly from their arm, which latter is slightly bent, so as to be nearly at right angles to the finger-beam in its passage across the platform.

At the inner end of the slat $d'$ is a vertical post, $h$, having an eye through it, through which passes a rod or pitman, N, one end of which is pivoted to one of the extension-arms near the pin, $f$, and the other end is connected to a device which is or may be upon the main frame, and which will give an intermittent endwise movement to said rod, which will cause an extension and contraction of the jointed arms L.

The invention is not confined to any particular contrivance for moving the rod N, as various means, actuated by the driving-wheels B, may be employed for this purpose.

During the acting-stroke of the rake, the hinged section J of the platform lies flat upon the bars $a\ a\ a$, so that the rake can sweep freely over it, clearing the platform of grain, and delivering the load in a bundle from the inner end of the platform upon the ground. Just before the rake commences to return to the outer end of the platform, the attendant, with his foot or hand, presses the arm $e^2$ forward, and raises the hinged section J to the inclined position indicated in fig. 3, in which position it allows the rake to pass beneath it to the outer end of the platform. When the hinged section J is raised, as described, it serves as a fender for preventing the cut grain from falling behind or outside of the rake. When the rake has reached the end of its outer stroke, the hinged portion J of the platform is depressed, to allow the rake to pass over it in the next stroke.

While I prefer to employ the extension-joints for operating and controlling the movements of the rake, I shall not confine myself to this particular contrivance, as a rake may be moved back and forth over the platform by other well-known means.

Having described my invention, what I claim as new, and desire to secure by Letters Patent, is—

1. A reciprocating rake, and a hinged platform-section, combined in such manner that after the rake moves across said platform, and delivers a gavel from the inner side thereof, it shall then return beneath said section to the outer end of the platform, substantially as described.

2. A platform, having a location behind the cutting-apparatus during the receiving and delivery operation, and a fender or guard, J, between the cutting-apparatus and the rear of the platform, in combination with a reciprocating rake, which takes the grain which has been cut from the platform, and delivers it at one side of the platform out of the path of the team, such rake being guided by machinery, the whole substantially as herein set forth.

3. A rake or clearer, which is controlled in its movements by extension-joints L, and a pitman-rod, N, and which is pivoted on top of the platform, in combination with a hinged grain-guard, J, which will protect the clearer from falling grain during its return-stroke, substantially as described.

4. The combination of a reciprocating rake, a side-delivery platform, a hinged guard, J, and an outer guard, $b$, substantially as described.

D. MENDENHALL.

Witnesses:
THOS. MORGAN,
D. B. MILLER.